United States Patent
Burgoyne, Jr.

(10) Patent No.: US 8,256,156 B1
(45) Date of Patent: Sep. 4, 2012

(54) PORTABLE ANGLER COOLER APPARATUS AND ASSOCIATED METHOD

(76) Inventor: John W. Burgoyne, Jr., Dundulk, MD (US)

(*) Notice: Subject to any disclaimer, the term of this patent is extended or adjusted under 35 U.S.C. 154(b) by 175 days.

(21) Appl. No.: 12/567,748

(22) Filed: Sep. 26, 2009

Related U.S. Application Data

(60) Provisional application No. 61/194,411, filed on Sep. 26, 2008.

(51) Int. Cl.
- A01K 97/06 (2006.01)
- F25D 3/08 (2006.01)
- B62K 13/00 (2006.01)
- A63C 17/18 (2006.01)

(52) U.S. Cl. ............ 43/54.1; 206/315.11; 224/922; 62/457.1; 62/457.7; 280/7.12; 280/7.14; 280/8; 280/10

(58) Field of Classification Search ............ 43/54.1, 43/55–57; 206/315.11; 224/920, 922; 62/457.1, 62/457.7; 280/8, 10, 7.12, 7.14

See application file for complete search history.

(56) References Cited

U.S. PATENT DOCUMENTS

| | | | |
|---|---|---|---|
| 304,621 A * | 9/1884 | Deetz | 280/13 |
| 473,434 A * | 4/1892 | Stevens | 280/7.14 |
| 490,240 A * | 1/1893 | Bendure et al. | 280/7.12 |
| 573,034 A * | 12/1896 | Peterson | 280/7.12 |
| 590,351 A * | 9/1897 | Wuggenig | 280/7.12 |
| 594,752 A * | 11/1897 | Owen | 280/13 |
| 613,773 A * | 11/1898 | Neumann | 280/7.12 |
| 613,940 A * | 11/1898 | Ringborg | 280/7.12 |
| 638,575 A * | 12/1899 | Guay | 280/7.14 |
| 639,672 A * | 12/1899 | Dietrich et al. | 280/7.14 |
| 650,171 A * | 5/1900 | Dannehl | 280/7.12 |
| 755,170 A * | 3/1904 | Reed | 280/7.14 |
| 764,442 A * | 7/1904 | Erickson et al. | 280/7.14 |
| 773,959 A * | 11/1904 | Meissner | 280/7.12 |
| 800,186 A * | 9/1905 | Vaughan | 280/7.14 |
| 850,125 A * | 4/1907 | Baldauf | 280/7.14 |
| 904,351 A * | 11/1908 | McCoy | 280/12.14 |
| 1,077,524 A * | 11/1913 | Gledhill | 280/13 |
| 1,128,698 A * | 2/1915 | Levy | 280/10 |
| 1,268,229 A * | 6/1918 | Frank | 280/7.14 |
| 1,337,396 A * | 4/1920 | Eiselt | 280/7.14 |
| 1,405,422 A * | 2/1922 | Kennedy | 43/54.1 |
| 1,435,609 A * | 11/1922 | Kelly | 280/11 |
| 1,592,443 A * | 7/1926 | Comstock | 43/54.1 |
| 1,654,284 A * | 12/1927 | Fageol | 280/16 |
| 1,714,902 A * | 5/1929 | Croswell | 280/9 |
| 2,081,024 A * | 5/1937 | Turner | 280/13 |
| 2,352,966 A * | 7/1944 | Morando | 280/8 |
| 2,443,699 A * | 6/1948 | Swain | 280/13 |
| 2,530,240 A * | 11/1950 | Graham | 280/13 |
| 2,741,486 A * | 4/1956 | Torgrimson | 280/13 |
| 2,823,971 A * | 2/1958 | Hoyt | 43/54.1 |
| 3,480,320 A * | 11/1969 | McIntosh et al. | 296/10 |
| 3,814,198 A * | 6/1974 | Seiler | 180/183 |

(Continued)

*Primary Examiner* — Darren W Ark

(57) ABSTRACT

A portable angler cooler apparatus includes two skis removably connected to a bottom-most circumferential edge of two wheels such that the wheels may remain elevated above a ground surface during transportation. A handle is pivotally coupled to a proximal end of the cooler such that the skis are removably connected to the handle after the skis are detached from the wheels. Each of the skis may have a pair of spring-loaded clips mated to opposed longitudinal edges of each wheel respectively so as to be selectively biased between tensioned and equilibrium positions when engaged and disengaged from each of the wheels and the handle respectively. A T-bar locks selected ones of the compartments at a closed position to prohibit premature disengagement from the cooler during transport.

8 Claims, 4 Drawing Sheets

U.S. PATENT DOCUMENTS

| | | | | | |
|---|---|---|---|---|---|
| 3,835,575 | A | * | 9/1974 | Kelley et al. | 43/56 |
| 3,874,683 | A | * | 4/1975 | Lawson | 280/10 |
| 4,085,987 | A | * | 4/1978 | Vartdal | 206/315.11 |
| 4,163,564 | A | * | 8/1979 | Kramer | 280/10 |
| 4,251,085 | A | * | 2/1981 | Lageer et al. | 280/10 |
| 4,291,891 | A | * | 9/1981 | Blanchette | 280/9 |
| 4,479,657 | A | * | 10/1984 | Reynolds | 280/8 |
| 4,541,539 | A | * | 9/1985 | Matthews | 43/26 |
| 4,618,157 | A | * | 10/1986 | Resnick | 280/8 |
| 4,827,658 | A | * | 5/1989 | Wolniak | 43/54.1 |
| 4,841,661 | A | * | 6/1989 | Moore | 43/54.1 |
| 4,842,289 | A | * | 6/1989 | Samuels | 280/8 |
| 4,873,841 | A | * | 10/1989 | Bradshaw et al. | 62/457.7 |
| 4,932,677 | A | * | 6/1990 | Shustack | 62/457.1 |
| 5,169,018 | A | * | 12/1992 | Fiore | 206/315.11 |
| 5,259,215 | A | * | 11/1993 | Rocca | 62/457.7 |
| 5,285,656 | A | * | 2/1994 | Peters | 62/457.7 |
| 5,305,544 | A | * | 4/1994 | Testa, Jr. | 43/54.1 |
| 5,313,817 | A | * | 5/1994 | Meinders | 62/457.1 |
| 5,333,885 | A | * | 8/1994 | Pullman | 280/47.19 |
| 5,373,708 | A | * | 12/1994 | Dumoulin, Jr. | 62/457.7 |
| 5,407,217 | A | * | 4/1995 | Lambert et al. | 280/10 |
| 5,413,361 | A | * | 5/1995 | Mosher | 280/8 |
| 5,423,195 | A | * | 6/1995 | Peters | 62/457.7 |
| 5,427,390 | A | * | 6/1995 | Duncan et al. | 280/8 |
| 5,465,985 | A | * | 11/1995 | Devan et al. | 62/457.7 |
| 5,605,056 | A | * | 2/1997 | Brown et al. | 43/55 |
| 5,620,191 | A | * | 4/1997 | Sayette | 280/8 |
| 5,704,158 | A | * | 1/1998 | Whiteaker | 43/54.1 |
| 5,864,981 | A | * | 2/1999 | Zeman | 43/54.1 |
| 5,881,874 | A | * | 3/1999 | McKinney | 206/315.11 |
| 5,911,422 | A | * | 6/1999 | Carpenter et al. | 280/10 |
| 5,941,015 | A | * | 8/1999 | Jenkins | 43/54.1 |
| 5,992,086 | A | * | 11/1999 | Cheng | 43/54.1 |
| 6,042,122 | A | * | 3/2000 | Mohr | 280/9 |
| 6,076,298 | A | * | 6/2000 | Teel | 43/54.1 |
| 6,185,860 | B1 | * | 2/2001 | Thibodeaux | 43/54.1 |
| 6,446,382 | B1 | * | 9/2002 | Cloutier et al. | 43/54.1 |
| 6,467,779 | B1 | * | 10/2002 | Mills | 224/922 |
| 6,474,097 | B2 | * | 11/2002 | Treppedi et al. | 62/457.7 |
| 6,554,294 | B2 | * | 4/2003 | Laudon | 280/16 |
| 6,691,451 | B1 | * | 2/2004 | Keenan | 43/54.1 |
| 6,708,989 | B1 | * | 3/2004 | Braun | 280/8 |
| 6,981,705 | B1 | * | 1/2006 | Jolley | 280/7.12 |
| 6,983,941 | B2 | * | 1/2006 | Moscaret et al. | 280/8 |
| 7,121,560 | B1 | * | 10/2006 | Balzano | 280/11 |
| 7,155,859 | B1 | * | 1/2007 | Brooks | 43/54.1 |
| 7,163,209 | B1 | * | 1/2007 | Moscaret et al. | 280/8 |
| 7,364,170 | B2 | * | 4/2008 | Aittama et al. | 280/10 |
| 7,389,608 | B1 | * | 6/2008 | MacKay | 43/57 |
| 7,415,794 | B1 | * | 8/2008 | Thompson | 43/54.1 |
| 7,461,477 | B2 | * | 12/2008 | Allen | 43/54.1 |
| 8,011,194 | B2 | * | 9/2011 | Dimmitt | 62/457.7 |
| 8,016,106 | B2 | * | 9/2011 | Schmitt | 43/54.1 |
| 2005/0279123 | A1 | * | 12/2005 | Maldonado et al. | 62/457.7 |
| 2006/0236589 | A1 | * | 10/2006 | Boyette et al. | 43/54.1 |
| 2007/0051031 | A1 | * | 3/2007 | Allen | 43/54.1 |
| 2007/0101754 | A1 | * | 5/2007 | Maldonado | 62/457.7 |
| 2010/0126196 | A1 | * | 5/2010 | McCance | 62/457.7 |
| 2011/0041545 | A1 | * | 2/2011 | Clement et al. | 62/457.1 |
| 2011/0253468 | A1 | * | 10/2011 | Rivard | 280/8 |

* cited by examiner

PORTABLE ANGLER COOLER APPARATUS AND ASSOCIATED METHOD

CROSS REFERENCE TO RELATED APPLICATIONS

This application claims the benefit of U.S. Provisional Application No. 61/194,411, filed Sep. 26, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an angler's tools and, more particularly, to a portable angler cooler apparatus and associated method for providing anglers with a convenient means of storing and transporting all of the gear they will need for a day of fishing.

2. Prior Art

For those if us who enjoy the outdoors, there are few ways to pass a day that compare to a day spent fishing. Whether we fish from a boat or a pier, riverbank or lakeshore, we go not only for the prospect of catching supper, but also for the experience itself. Fishing offers something for everyone. Some anglers enjoy the physical activity of fly-fishing or surf fishing while some anglers prefer the quiet contemplation afforded by slow and steady pier fishing, where one casts out a baited rig and then waits, others enjoy trolling from boats. In each case, fishing puts us into the natural world, forces us to consider things from the fish's point of view. A day of fishing forces us to slow down, leave the frantic pace of human society behind for a while, and focus not on our own cares and petty problems, but on the far simpler matter of catching a fish. A day of fishing forces the mind, like a river, to flow smoothly between banks, in a channel of concentration and enjoyment. Add this to the fact that we may catch our own supper, or even a record fish, and the appeal of fishing is easy to see.

Fishing is one of life's greatest pastimes, but as with anything, there are certain drawbacks. In fishing, the biggest drawback is the sheer amount of stuff you have to carry. Ice, bait, tackle, beer, rods and reels, pliers, knives, and of course, spares for everything you might break or lose. What is needed is a way to get all the gear to the fishing spot in one trip.

Accordingly, a need remains for an apparatus in order to overcome the above-noted shortcomings. The present invention satisfies such a need by providing an portable angler cooler apparatus that is convenient and easy to use, lightweight yet durable in design, and intended to provide users with an effective means of transporting all of their fishing equipment in one compact carrier.

BRIEF SUMMARY OF THE INVENTION

In view of the foregoing background, it is therefore an object of the present invention to provide an apparatus for anglers to store and transport all of the gear they will need for a day of fishing. These and other objects, features, and advantages of the invention are provided by a portable angler cooler apparatus.

The portable angler cooler apparatus for storing and transporting bait and fishing accessories may include a cooler having a lid pivotally coupled to a longitudinal side and a plurality of separated compartments for storing bait and fishing accessories. A plurality of wheels may further be rotatably mated to the distal end of the cooler.

The apparatus may further include a plurality of skis removably connected to a bottom-most circumferential edge of the wheels such that the wheels may remain elevated above a ground surface during transportation. A handle may be pivotally coupled to a proximal end of the cooler for assisting a user to lift the proximal end of the cooler and transport the cooler via the wheels and the skis. The skis may further be removably connected to the handle after the skis are detached from the wheels. Each of the skis may have a pair of spring-loaded clips mated to opposed longitudinal edges of each wheel respectively so as to be selectively biased between tensioned and equilibrium positions when engaged and disengaged from each of the wheels and the handle respectively.

In one embodiment, the separated compartments may include a first compartment situated at an upper level of the cooler for storing food and drink and a second compartment situated at the upper level of the cooler. The second compartment may be continuously positioned adjacent to the first compartment and may be used for storing ice and fish, for example. A third compartment may further be situated inside the second compartment for holding the bait and water and may include an air hose for aerating the water therein. Additionally, each of the first, second and third compartments are provided with a dedicated drain outlet independently adaptable between open and closed positions.

In one embodiment, the separated compartments may further include first and second pairs of side entry drawers located underneath the first compartment. Each of the first and second pairs of side entry drawers may have a plurality of pockets adapted to store fishing tackle and may further be independently accessed from the left and right longitudinal sides of the cooler. A T-bar may be pivotally mated to the cooler in such a manner that the first and second pairs of the side entry drawers are unlocked when the T-bar is biased to a lowered position and locked when the T-bar is at a raised position.

In one embodiment, a rod holder may be directly connected to the left and right longitudinal sides of the cooler. The rod holder preferably has a rectilinear tubular shape oriented along a vertical plane registered orthogonal to a longitudinal length of the cooler.

In one embodiment, the top lid of the cooler may be provided with a plurality of cup holders to receive beverage cans.

The present invention may further include a method of utilizing a portable angler cooler apparatus for storing and transporting bait and fishing accessories. The method may include the chronological steps of: providing a cooler preferably having a lid pivotally coupled to a longitudinal side thereof, wherein the cooler has a plurality of separated compartments; storing the bait and the fishing accessories within the separated compartments respectively; providing and rotatably mating a plurality of wheels to the distal end of the cooler; and elevating the wheels above a ground surface during transport by providing and removably connecting a plurality of skis to a bottom-most circumferential edge of the wheels.

The method may further include the chronological steps of: lifting the proximal end of the cooler and transporting the cooler via the wheels and the skis by providing and pivotally coupling a handle to a proximal end of the cooler; detaching the skis from the wheels; and removably connecting the skis to the handle.

The method may further include the chronological step of: providing each of the skis with a pair of spring-loaded clips mated to opposed longitudinal edges of the wheels and handle respectively. In this manner, the spring-loaded clips are selectively biased between tensioned and equilibrium positions when engaged and disengaged from each of the wheels and the handle respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1A:
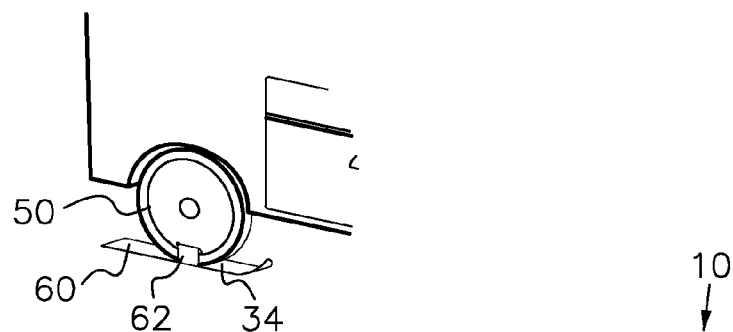
FIG. 1a is an enlarged perspective view showing the left side of the cooler with the second wheel and second ski attached thereto.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus 10 of this invention is referred to generally in FIGS. 1-4a by reference numeral 10 and is intended to provide a portable angler cooler apparatus 10. It should be understood that the portable angler cooler apparatus 10 may be used to store and transport all the gear that anglers may need for a day of fishing as well as many other similar type of goods and equipment.

Figure 1:
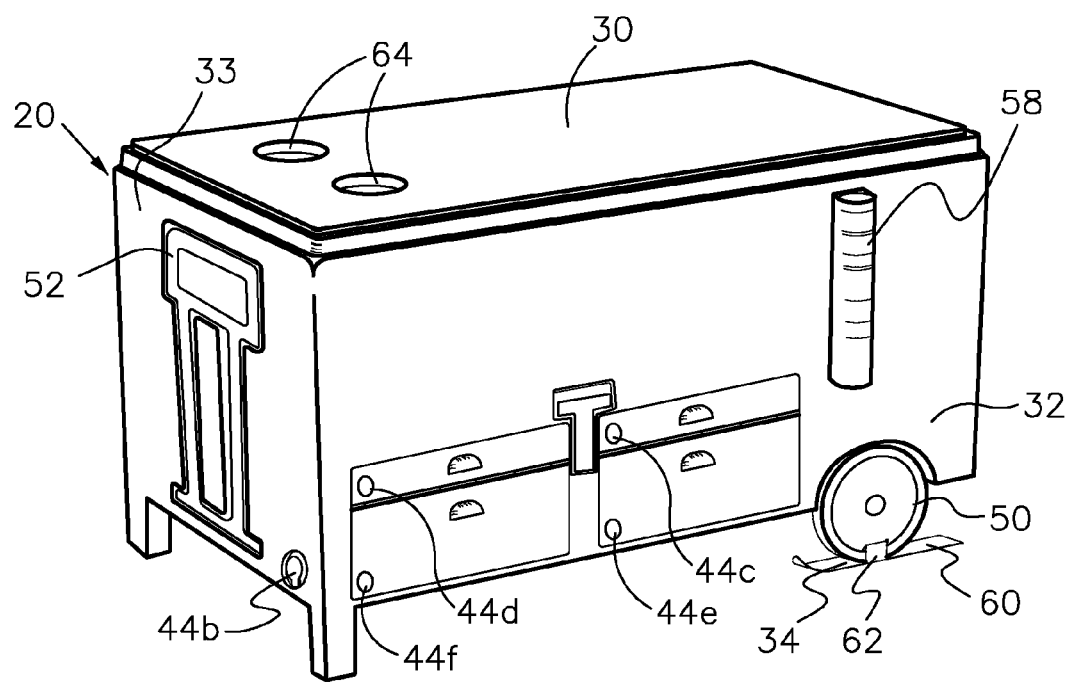
FIG. 1 is a perspective view showing a portable angler cooler apparatus, in accordance with the present invention.
Figure 2:
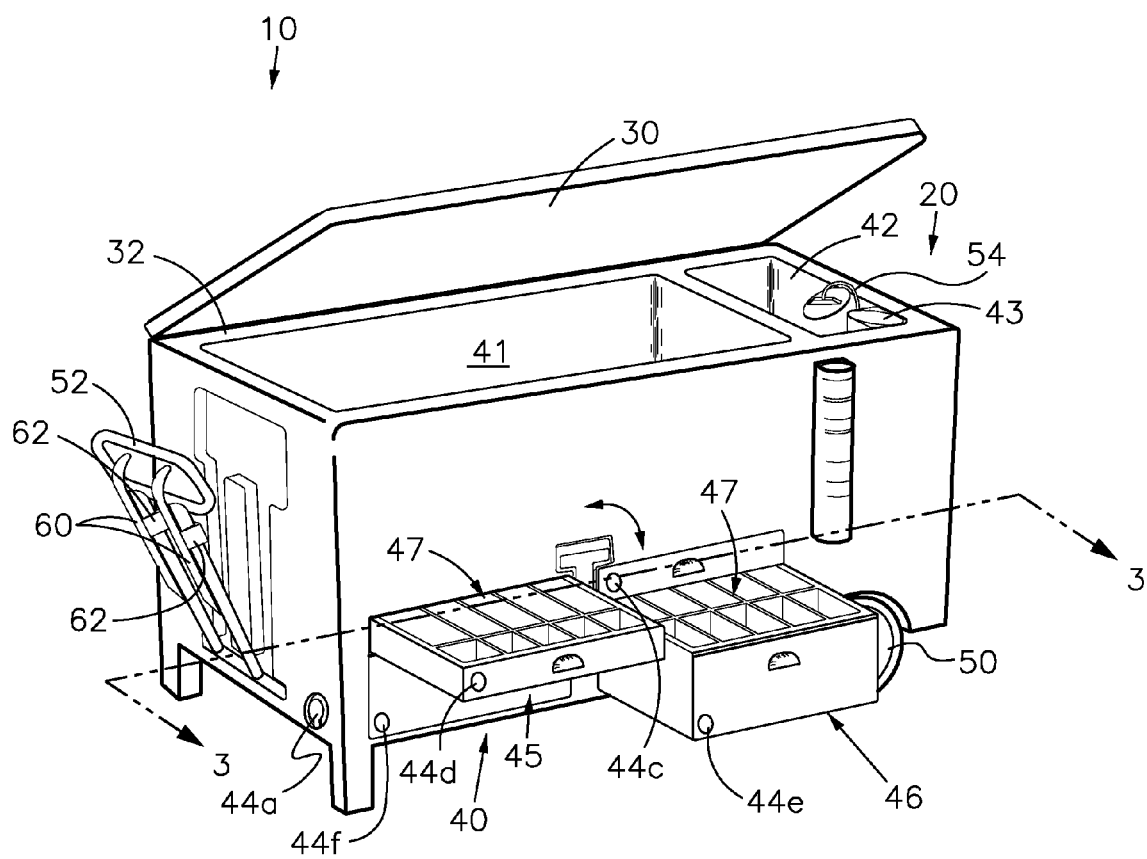
FIG. 2 is perspective view showing the drawers, lid, handle and T-bar biased to open positions, respectively.

Referring initially to FIGS. 1, 1a and 2, the portable angler cooler apparatus 10 stores and transports bait and fishing accessories and may include a cooler 20 having a lid 30 pivotally coupled to a longitudinal side 32 and a plurality of separated compartments 40 for storing bait and fishing accessories. A plurality of wheels 50 may further be rotatably mated to a distal end 32 of the cooler 20.

The apparatus 10 may further include a plurality of skis 60 removably connected to a bottom-most circumferential edge 34 thereof such that the wheels 50 may remain elevated above a ground surface during transportation. A handle 52 may be pivotally coupled to a proximal end 33 of the cooler 20 for assisting a user to lift the proximal end 33 of the cooler 20 and transport the cooler 20 via the wheels 50 and the skis 60. The skis 60 may further be removably connected to the handle 52 after the skis 60 are detached from the wheels 50.

For example, each ski 60 may have a pair of spring-loaded clips 62 mated to opposed longitudinal edges 35 thereof respectively so as to be selectively biased between tensioned and equilibrium positions when engaged and disengaged from each of the wheels 50 and the handle 52, respectively. Such a combination of claimed elements provides the unexpected and unpredictable benefit of allowing the user to quickly connect and disconnect the skis 60 to wheels 50 when traveling over uneven and even terrains, respectively. Such a benefit solves the problem of having to awkwardly drag the wheels 50 along slippery surfaces such as ice and snow.

Figure 3:
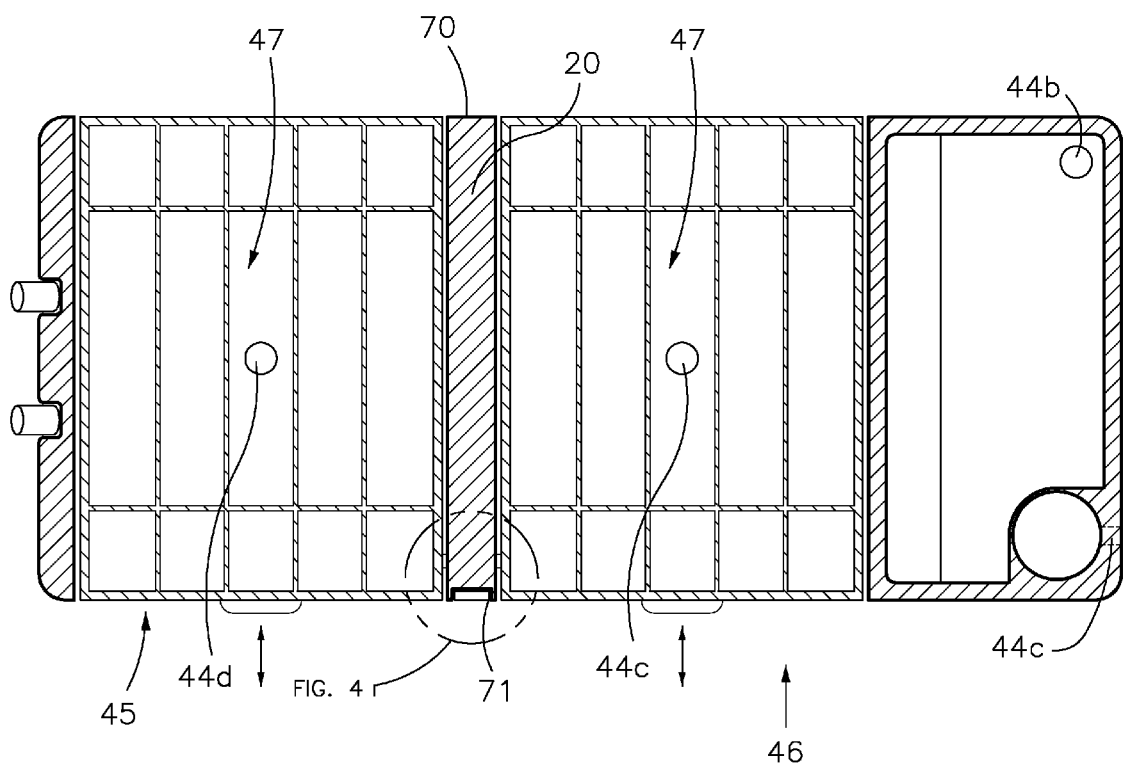
FIG. 3 is a cross-sectional view taken along line 3-3 showing the interrelationship between the sliding drawers and the T-bar when the drawers are recessed at a locked position.

Referring to FIGS. 1-3, the separated compartments 40 may include a first compartment 41 situated at an upper level of the cooler 20 for storing food and drink and a second compartment 42 situated at the upper level of the cooler 20. The second compartment 42 may be continuously positioned adjacent to the first compartment 41 and may be used for storing ice and fish, for example. A third compartment 43 may further be situated inside the second compartment 42 for holding the bait and water and may include an air hose 54 for aerating the water therein. Additionally, each of the first 41, second 42 and third 43 compartments are provided with a dedicated drain outlet 44a-44f independently adaptable between open and closed positions. Such a combination of claimed elements provides the unexpected and unpredictable benefit of permitting the angler to isolate each type of fishing tackle and accessory in a dedicated compartment. Such a benefit solves the problem of undesirable entanglement of fishing tackle and accessories when the cooler 20 is transported.

Referring to FIGS. 1-3, the separated compartments 40 may further include first and second pairs of side entry drawers 45, 46 located underneath the first compartment 41 respectively. Each of the first and second pairs of side entry drawers 45, 46 may have a plurality of pockets 47 adapted to store fishing tackle and may further be independently accessed from the left and right longitudinal sides 70, 71 of the cooler 20. A T-bar 56 may be pivotally mated to the cooler 20 in such a manner that the first and second pairs of the side entry drawers are locked when the T-bar 56 is biased to a lowered position. Such a combination of claimed elements provides the unexpected and unpredictable benefit of preventing undesirable movement of drawer pairs 45, 46 during cooler 20 transport. Such a benefit solves the problem of premature ejection of the fishing tackle and accessories from the drawer pairs 45, 46.

Figure 4:
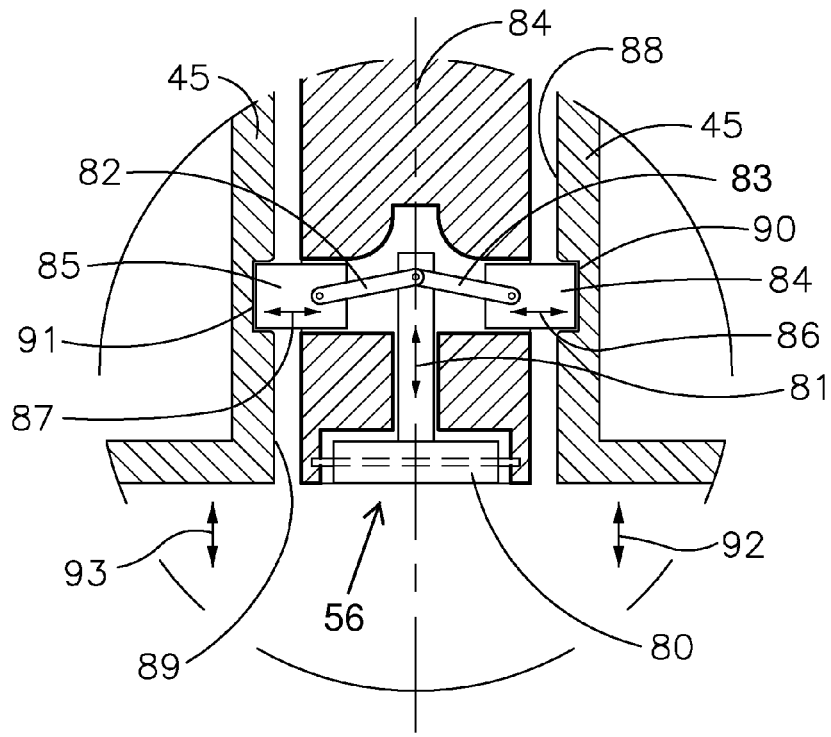
FIGS. 4 and 4a are enlarged views showing the operable connection between the T-bar and drawers in order to prevent and prohibit the drawers from prematurely sliding out of the cooler when the T-bar is at raised and lowered positions, respectively.
Figure 4A:
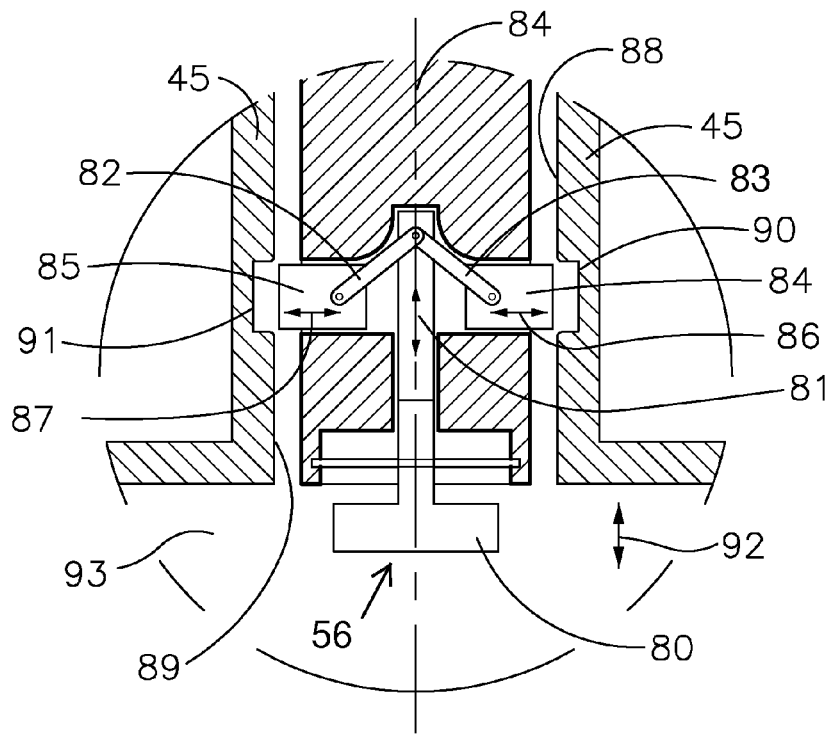

Referring to FIGS. 4 and 4a, the T-bar preferably includes a drive lever 80 selectively pivotal between a vertically raised position (as perhaps best shown in FIG. 4) and a horizontally lowered position (as perhaps best shown in FIG. 4a). A driven lever 81 is statically mated to the drive lever 80 and is registered orthogonal thereto. A pair of cam arms 82, 83 are pivotally connected to a distal end of the driven lever 81 and laterally flange outwardly away from a longitudinal axis 84 of the driven lever 81. A pair of corresponding stop blocks 84, 85 pivotally coupled directly to distal ends of said cam arms 81, 82 and thereby laterally reciprocate along mutually exclusive first and second linear paths 86, 87 intersecting a medial edge 88, 89 of each first and second pairs of drawers 45, 46, respectively.

In this manner, each stop block 84, 85 interfits within a corresponding notch 90, 91 formed in medial edges 88, 89 and thereby prohibits linear movement of drawer pairs 45, 46 along third and fourth linear paths 92, 93, which are orthogonal to linear paths 86, 87, respectively. Such a combination of claimed elements provides the unexpected and unpredictable benefit of preventing undesirable movement of drawer pairs 45, 46 during cooler 20 transport. Such a benefit solves the problem of premature ejection of the fishing tackle and accessories from the drawer pairs 45, 46. In particular, when the driven lever 80 is at the horizontally lowered position, the stop blocks 84, 85 are retracted inwardly away from the notches 90, 91. In this manner, the angler can quickly determine that the drawer pairs 45, 46 can be withdrawn from cooler 20. When the driven lever 80 is at the vertically raised position, the stop blocks 84, 85 are extended outwardly into the notches 90, 91. In this manner, the angler can quickly determine that the drawer pairs 45, 46 cannot be withdrawn from cooler 20.

Referring back to FIGS. 1 and 2, a rod holder 58 may be directly connected to each of the left and right longitudinal sides 70, 71 of the cooler 20 respectively. The rod holder 58 preferably has a rectilinear tubular shape oriented along a vertical plane registered orthogonal to a longitudinal length of the cooler 20.

Referring to FIG. 1, the top lid 30 of the cooler 20 may be provided with a plurality of cup holders 64 to receive beverage cans.

The present invention may further include a method of utilizing a portable angler cooler apparatus 10 for storing and transporting bait and fishing accessories. The method may include the chronological steps of: providing a cooler 20 preferably having a lid 30 pivotally coupled to a longitudinal side 32 thereof, wherein the cooler 20 has a plurality of separated compartments 40; storing the bait and the fishing accessories within the separated compartments 40 respectively; providing and rotatably mating a plurality of wheels 50 to the distal end 32 of the cooler 20; and elevating the wheels 50 above a ground surface during transport by providing and removably connecting a plurality of skis 60 to a bottom-most circumferential edge 34 of the wheels 50. Such a combination of claimed elements provides the unexpected and unpredictable benefit of permitting the angler to quickly attach and detach the skis 60 to wheels 50, when transporting the cooler 20 over ice/snow and uneven terrain, respectively. Such a benefit solves the problem of having to manually detach the wheels 50 from the cooler 20, in order to use skis 60.

The method may further include the chronological steps of: lifting the proximal end 33 of the cooler 20 and transporting the cooler 20 via the wheels 50 and the skis 60 by providing and pivotally coupling a handle 52 to a proximal end 33 of the cooler 20; detaching the skis 60 from the wheels 50; and removably connecting the skis 60 to the handle 52.

The method may further include the chronological step of: providing each of the skis 60 with a pair of spring-loaded clips 62 mated to opposed longitudinal edges 35 of the wheels 50 and handle 52 respectively. In this manner, the spring-loaded clips 62 are selectively biased between tensioned and equilibrium positions when engaged and disengaged from each of the wheels 50 and the handle 52 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable cooler apparatus for storing and transporting bait and fishing accessories, said portable angler cooler apparatus comprising:
   a cooler having left and right longitudinal sides and a lid pivotally coupled to one of said longitudinal sides, said cooler including having a plurality of separated compartments adapted to store the bait and the fishing accessories therein respectively;
   a plurality of wheels rotatably mated to a distal end of said cooler;
   a plurality of skis removably connected to bottom-most circumferential edges of said wheels so that said wheels remain elevated above a ground surface during transport; and
   a handle pivotally coupled to a proximal end of said cooler for assisting a user to lift said proximal end and transport said cooler via said wheels and said skis;
   wherein said skis are removably connected to said handle after said skis are detached from said wheels;
   wherein said separated compartments comprise:
   a first compartment situated at an upper level of said cooler and being adapted to store food and drink therein;
   a second compartment situated at said upper level of said cooler and being continuously positioned adjacent to said first compartment, said second compartment being adapted to store ice and fish therein; and
   a third compartment situated inside said second compartment and being adapted to hold the bait and water therein, said third compartment including an air hose for aerating water therein;
   wherein each of said first, second and third compartments is provided with a dedicated drain outlet independently adaptable between open and closed positions;
   wherein said separated compartments further comprise:
   first and second pairs of side entry drawers located underneath said first compartment;

each of said first and second pairs of side entry drawers having a plurality of pockets adapted to store fishing tackle therein, wherein each of said first and second pairs of side entry drawers are independently accessed from said left and right longitudinal sides of said cooler; and a T-bar pivotally mated to said cooler in such a manner that said first and second pairs of said side entry drawers are locked when said T-bar is biased to a raised position and unlocked when said T-bar is biased to a lowered position.

2. The portable angler cooler apparatus of claim 1, further comprising: a rod holder directly connected to each of said left and right longitudinal sides of said cooler, said rod holder having a rectilinear tubular shape and being oriented along a vertical plane registered orthogonal to a longitudinal length of said cooler.

3. The portable angler cooler apparatus of claim 2, wherein said top lid of said cooler is provided with a plurality of cup holders adapted to receive beverage cans thereon respectively.

4. The portable angler cooler apparatus of claim 1, wherein said T-bar comprises:
a drive lever selectively pivotable between a vertically raised position and a horizontally lowered position;
a driven lever statically mated to said drive lever and registered orthogonal thereto;
a plurality of cam arms pivotally connected to a distal end of said driven lever and laterally flanging outwardly away from a longitudinal axis of said driven lever;
a plurality of corresponding stop blocks pivotally coupled directly to distal ends of said cam arms respectively;
a plurality of notches formed in corresponding medial edges of said first and second pairs of drawers respectively;
wherein said stop blocks laterally reciprocate along mutually exclusive first and second linear paths intersecting said medial edges of said first and second pairs of drawers such that each said stop block interfits within a corresponding one of said notches and thereby prohibits linear movement of respective pairs of drawers along third and fourth liner paths;
wherein said first and second linear paths are orthogonal to said third and fourth linear paths, respectively.

5. A portable angler cooler apparatus for storing and transporting bait and fishing accessories, said portable angler cooler apparatus comprising:
a cooler having left and right longitudinal sides and a lid pivotally coupled to one of said longitudinal sides, said cooler including a plurality of separated compartments adapted to store the bait and the fishing accessories therein respectively;
a plurality of wheels rotatably mated to a distal end of said cooler;
a plurality of skis removably connected to bottom-most circumferential edges of said wheels so that said wheels remain elevated above a ground surface during transport; and
a handle pivotally coupled to a proximal end of said cooler for assisting a user to lift said proximal end and transport said cooler via said wheels and said skis;
wherein said skis are removably connected to said handle after said skis are detached from said wheels;
wherein each of said skis has a pair of spring-loaded clips mated to opposed longitudinal edges thereof respectively, said spring-loaded clips being selectively biased between tensioned and equilibrium positions when engaged and disengaged from each of said wheels and said handle respectively;
wherein said separated compartments comprise:
a first compartment situated at an upper level of said cooler and being adapted to store food and drink therein;
a second compartment situated at said upper level of said cooler and having continuously positioned adjacent to said first compartment, said second compartment being adapted to store ice and fish therein; and
a third compartment situated inside said second compartment and being adapted to hold the bait and water therein, said third compartment including an air hose for aerating the water therein;
wherein each of said first, second and third compartments is provided with a dedicated drain outlet independently adaptable between open and closed positions;
wherein said separated compartments further comprise:
first and second pairs of side entry drawers located underneath said first compartment;
each of said first and second pairs of side entry drawers having a plurality of pockets adapted to store fishing tackle therein, wherein each of said first and second pairs of side entry drawers are independently accessed from said left and right longitudinal sides of said cooler; and
a T-bar pivotally mated to said cooler in such a manner that said first and second pairs of said side entry drawers are locked when said T-bar is biased to a raised position and unlocked when said T-bar is biased to a lowered position.

6. The portable angler cooler apparatus of claim 5, wherein said T-bar comprises:
a drive lever selectively pivotable between a vertically raised position and a horizontally lowered position;
a driven lever statically mated to said drive lever and registered orthogonal thereto;
a plurality of cam arms pivotally connected to a distal end of said driven lever and laterally flanging outwardly away from a longitudinal axis of said driven lever;
a plurality of corresponding stop blocks pivotally coupled directly to distal ends of said cam arms respectively;
a plurality of notches formed in corresponding medial edges of said first and second pairs of drawers respectively;
wherein said stop blocks laterally reciprocate along mutually exclusive first and second linear paths intersecting said medial edges of said first and second pairs of drawers such that each said stop block interfits within a corresponding one of said notches and thereby prohibits linear movement of respective pairs of drawers along third and fourth linear paths;
wherein said first and second linear paths are orthogonal to said third and fourth linear paths, respectively.

7. The portable angler cooler apparatus of claim 5, further comprising: a rod holder directly connected to each of said left and right longitudinal sides of said cooler, said rod holder having a rectilinear tubular shape and being oriented along a vertical plane registered orthogonal to a longitudinal length of said cooler.

8. The portable angler cooler apparatus of claim 5, wherein said top lid of said cooler is provided with a plurality of cup holders adapted to receive beverage cans thereon respectively.

* * * * *